United States Patent
Yoshida et al.

[11] Patent Number: 5,890,566
[45] Date of Patent: *Apr. 6, 1999

[54] FRICTION PAD FOR DISC BRAKE

[75] Inventors: Hirokazu Yoshida; Seiya Odaka, both of Saitama, Japan

[73] Assignee: Akebono Brake Industry Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 816,778

[22] Filed: Mar. 19, 1997

[30] Foreign Application Priority Data

Mar. 25, 1996 [JP] Japan ..................................... 8-094788

[51] Int. Cl.⁶ ............................. F16D 65/04; F16D 69/00
[52] U.S. Cl. .................... 188/73.1; 188/234; 188/250 G; 188/250 B
[58] Field of Search ............................ 188/73.1, 250 B, 188/250 G, 250 R, 250 A, 73.43, 73.2, 73.39, 72.4, 250 F, 234, 244, 73.31, 218, 247, 248, 264 G, 251 R, 258; 192/70.13, 70.14, 107 R, 107 M, 107 T

[56] References Cited

U.S. PATENT DOCUMENTS

| | | |
|---|---|---|
| 3,768,603 | 10/1973 | Hoffman ................................ 188/72.3 |
| 3,958,667 | 5/1976 | De Gennes ............................ 188/73.1 |
| 4,121,699 | 10/1978 | Tsuruta et al. ....................... 188/73.43 |
| 4,146,118 | 3/1979 | Zankl .................................... 188/73.1 |
| 4,609,077 | 9/1986 | Nakatsuhara ......................... 188/73.38 |
| 4,805,746 | 2/1989 | Katagiri .............................. 188/250 B |
| 5,033,590 | 7/1991 | Kobayashi et al. ................. 188/250 B |
| 5,129,487 | 7/1992 | Kobayashi et al. ..................... 188/73.1 |
| 5,285,873 | 2/1994 | Arbesman .............................. 188/73.1 |

FOREIGN PATENT DOCUMENTS

| | | |
|---|---|---|
| 0 435 548 A1 | 7/1991 | European Pat. Off. . |
| 58-207535 | 12/1983 | Japan ................................. 188/73.37 |
| 61-266838 | 11/1986 | Japan ................................. 188/250 B |
| 62-130233 | 8/1987 | Japan . |
| 6101725 | 4/1994 | Japan ................................. 188/250 G |
| 2 130 319 | 5/1984 | United Kingdom . |
| 2 303 831 | 3/1997 | United Kingdom . |

*Primary Examiner*—Douglas C. Butler
*Attorney, Agent, or Firm*—Morgan, Lewis & Bockius LLP

[57] ABSTRACT

A lining is attached on a front surface of a back plate and a protrusion for the engagement with a caliper is formed on a back surface of the back plate, and a recess is formed at a tip end of the protrusion and the cross-sectional view of the protrusion is H-shaped.

2 Claims, 3 Drawing Sheets

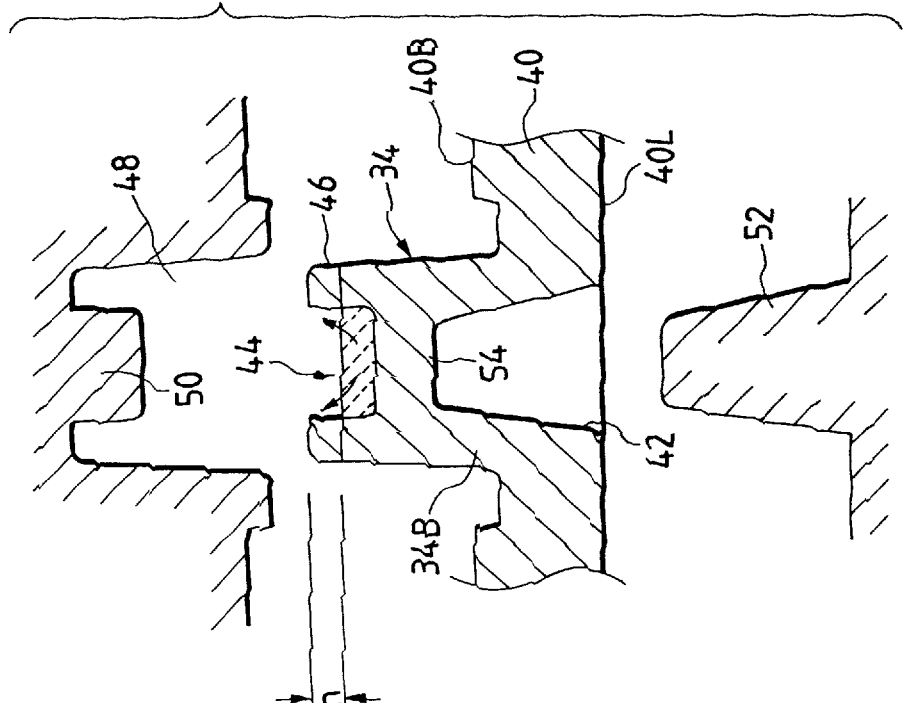
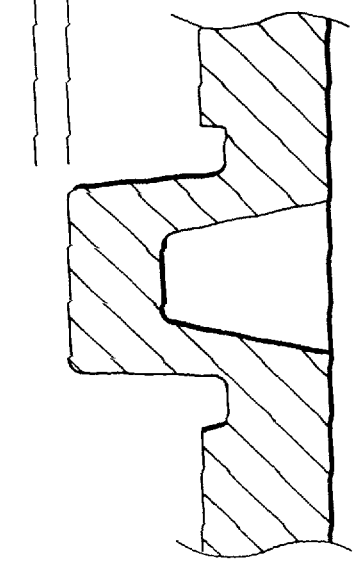
FIG. 2(a)
PRIOR ART
FIG. 2(b)

FRICTION PAD FOR DISC BRAKE

BACKGROUND OF THE INVENTION

1. Field of the Invention

The present invention relates to a friction pad for a disc brake and more particularly to an improvement for a friction pad used for a disc brake in which a braking torque generated on an outer pad is supported by a stationary portion of the vehicle via a caliper.

2. Description of the Prior Art

As the conventional disc brake, there has been known such a disc brake that a braking torque generated on an outer pad is supported by a stationary portion of the vehicle via a caliper and a braking torque generated on an inner pad is supported by a support member (for example, Japanese Utility Model Publication No. Sho. 62-130233). In this disc brake, the caliper straddling a rotor is movably supported by a support member which is attached to the vehicle body in such a manner that the caliper is movable in an axial direction of the rotor axis via a pair of guide pins, and the inner pad is brought into pressure contact with the rotor by a hydraulic pressure cylinder device disposed on the inner side of the caliper. By the reaction force, the caliper is moved, so that a caliper pawl on the outer side brings the outer pad into pressure contact with the rotor. In this case, the outer pad is fitted to the caliper pawl via a concave and convex fitting structure and the braking torque generated on the outer pad is transmitted to the caliper pawl.

In the aforementioned disc brake, the braking torque generated on the inner pad is supported by the support member, and the braking torque generated on the outer pad is transmitted to a rotor run-in side guide pin via the caliper pawl so as to be supported by the vehicle body. Accordingly, a protrusion which engages with a torque transmission hole formed in the caliper pawl is formed in a back plate of the outer pad in the conventional brake.

The aforementioned protrusion is formed by press-drawing. For example, as disclosed in the above Japanese Utility Model Publication No. Sho. 62-130233, a recess is worked on a front surface on which a lining is attached of the back plate, thereby the protrusion is formed on a back surface of the back plate, and the back plate is attached to the caliper via the back surface.

However, when the protrusion is formed on the back plate, the press-drawing is performed from the side of the front surface on which a lining is attached. Therefore, a problem occurs in that the thickness of the back plate at a base portion of the protrusion is decreased because it is necessary to secure enough height for the protrusion that the pad is supported securely. So the height of the protrusion has been limited in view of the thickness of the base portion of the back plate. Accordingly, it has been necessary to reinforce the engagement of the outer pad with the torque transmission hole by a clip provided separately. For this reason, problems such as encreased of parts and complicated structure of the back plate have been encountered.

SUMMARY OF THE INVENTION

An object of the present invention made in view of the foregoing problems is to provide a friction pad for the disc brake capable of readily securing enough height of the protrusion in which the thickness of the base portion of the protrusion is not reduced.

According to the present invention, there is provided a friction pad for a disc brake comprising: a back plate having a protrusion formed on a back surface thereof, the back plate being engaged with a caliper in such a manner that the protrusion is inserted into a torque transmission hole; and a lining attached on a front surface of the back plate; wherein a recess is formed at a tip end of the protrusion so as to extend a length of the protrusion.

In the above friction pad, a sectional view of the protrusion may be H-shaped.

Further, the protrusion may have a cylindrical shape, and a circular projected portion may be formed at an outer edge portion of the tip end of the protrusion so as to form the recess.

In the aforementioned construction, the protrusion is formed by the press-drawing from the side of the front surface on which the lining is attached so as to be projected from the back surface of the back plate. Hereupon, a recess is formed at a tip end of the protrusion, and the thick portion at the tip end is thinned so as to generate a metal flow to the side portion of the protrusion, and the metal flow forms the circular projected portion so that the height of the protrusion is increased. As a result, the sectional coefficient of the protrusion is secured by a partitioning wall formed at a middle portion of the protrusion while the height of the protrusion is increased. The caliper pawl is attached or connected to the torque transmission hole with ease. Therefore, it becomes possible to prevent the pad from tilting by the separation thereof. The tip end of the protrusion has the same thickness as that of the thick portion of the back plate and the metal flow from the tip end contributes to the formation of the circular projected portion which causes the extension of the length of the protrusion. Therefore, the thickness of the base portion of the protrusion is not reduced, and the base portion does not affect the shear strength of the protrusion.

BRIEF DESCRIPTION OF THE DRAWINGS

In the accompanying drawings:

FIG. 2(a) is a sectional view of a protrusion formed on a back plate of a pad according to an embodiment of the present invention, and FIG. 2(b) is a sectional view of a protrusion formed on a conventional pad;

DETAILED DESCRIPTION OF THE PREFERRED EMBODIMENTS

A detailed description of the preferred embodiment of the friction pad for the disc brake according to the present invention will be given subsequently with reference to the attached drawings.

Figure 3:
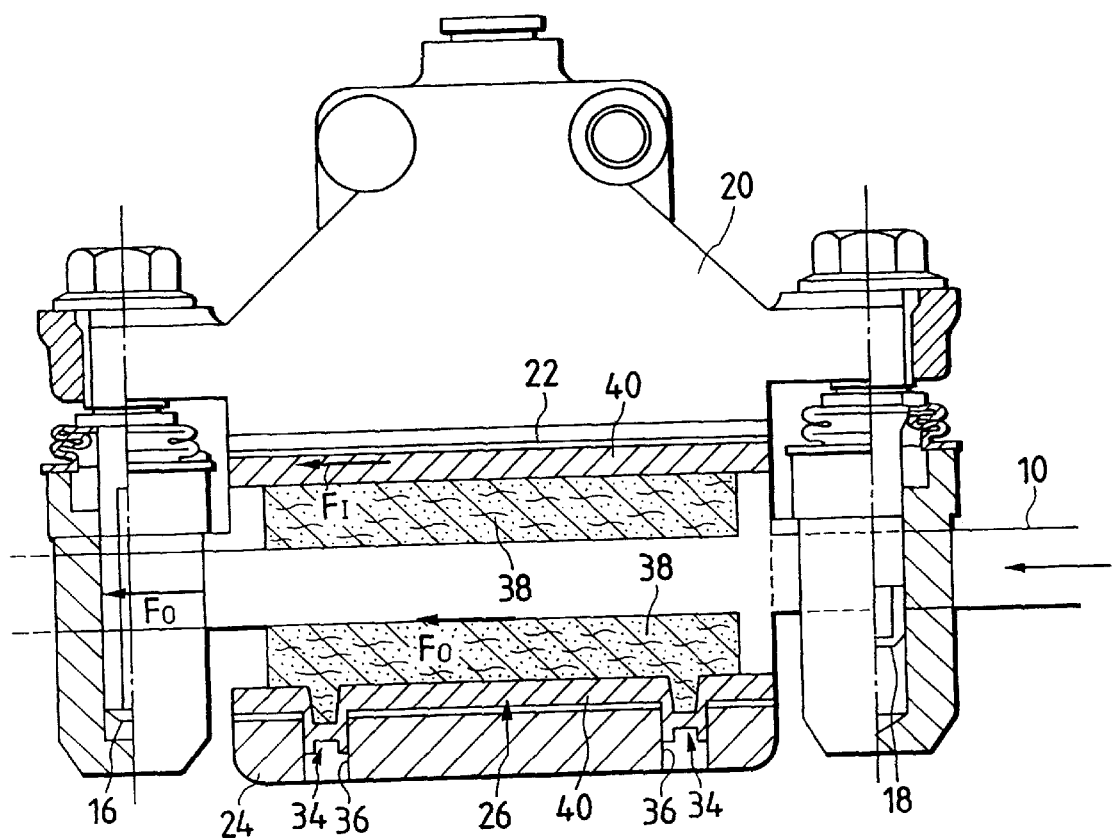
FIG. 3 is a plan sectional view of a disc brake on which the pad of the embodiment is attached.
Figure 4:
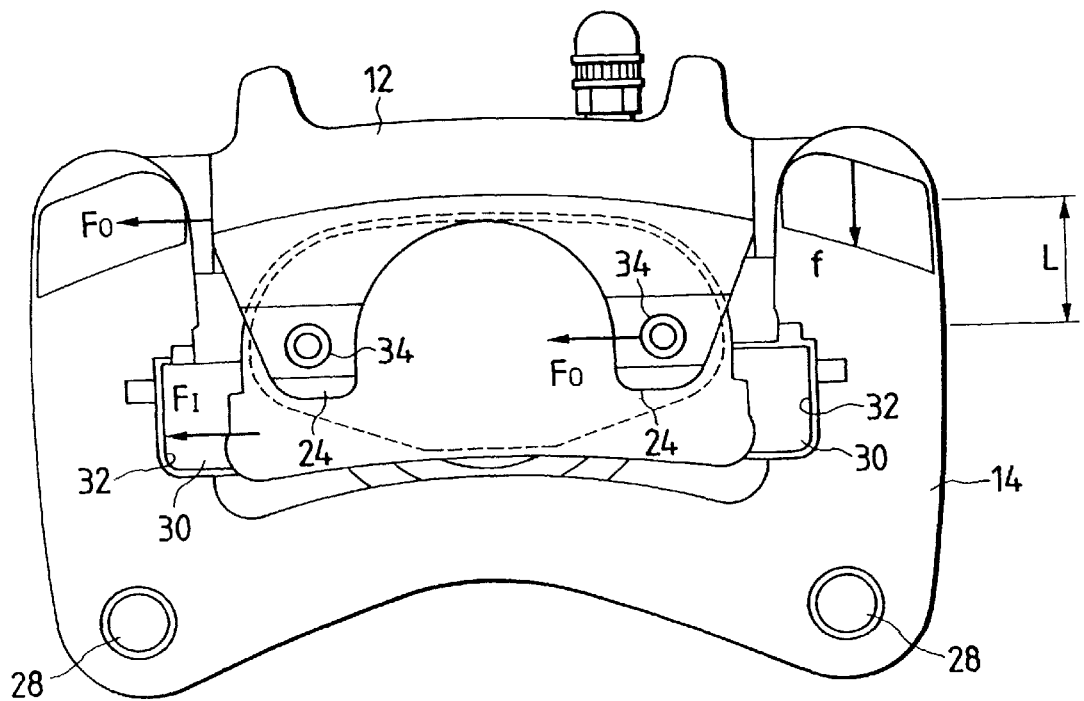
FIG. 4 is a front view of the disc brake in FIG. 3.

FIGS. 3 and 4 show a structure of a disc brake to which a friction pad of an embodiment of the present invention is attached. The disc brake comprises a caliper 12 straddling a rotor 10 and a support member 14 fixed to the vehicle body. The caliper is slidably movable in the axial direction of the rotor axis via guide pins 16, 18 which are parallel with each other and constitute a slidable guide mechanism. A hydraulic pressure cylinder device 20 is provided on an inner side of the caliper 12 to bring an inner pad 22 into pressure contact with the rotor 10. The caliper 12 is moved by the reaction force from the inner pad 22, and a caliper pawl 24 on an outer side brings an outer pad 26 into pressure contact with the rotor 10.

The support member 14 is disposed opposed to an inner surface of the rotor 10 and fixed to the vehicle body at the screw hole 28 which is positioned closer to the center of the rotor than the position of the guide pins 16, 18. The guide pins 16 and 18 are positioned on an outside of the periphery of the rotor 10. The inner pad 22 is attached to the support member 14 while being slidably movable in the axial direction of the rotor and the support member 14 supports the rotation torque generated by braking. This support is achieved by the braking anchor portion which is a concave and convex fitting structure comprising anchor projections 30 formed on both sides of the inner pad 22 and anchor concave grooves 32 formed in the support member 14 correspondery to the anchor projections 30 and extending in the axial direction of the rotor. When the hydraulic pressure cylinder device 20 of the caliper 12 is actuated, the inner pad 22 is moved and guided by the concave and convex fitting structure to be brought into pressure contact with the rotor 10. At this time, the concave and convex fitting structure functions as the anchor and receives the braking torque.

On the other hand, by the pressure reaction force generated by the inner pad 22, the caliper 12 is guided by the guide pins 16, 18 and moved to the inner side along the axial direction of the rotor, so that the outer pad 26 is brought into pressure contact with the rotor 10 by the caliper pawl 24. The braking torque generated on the outer pad 26 should be transmitted to the caliper 12. Therefore, protrusions 34 are formed on the back surface of the outer pad 26, and torque transmission holes 36 into which the protrusions 34 are inserted are formed in the caliper pawl 24. The caliper pawl 24 is branched and the respective pawl engages with the outer pad 26. Therefore, if the outer pad 26 is brought into pressure contact with the rotor 10 and the braking torque is generated, the braking torque is transmitted to the caliper 12 via the protrusions 34, further, the braking torque is transmitted via the rotor run-out side guide pin 16 and supported by the support member 14.

Figure 1A:
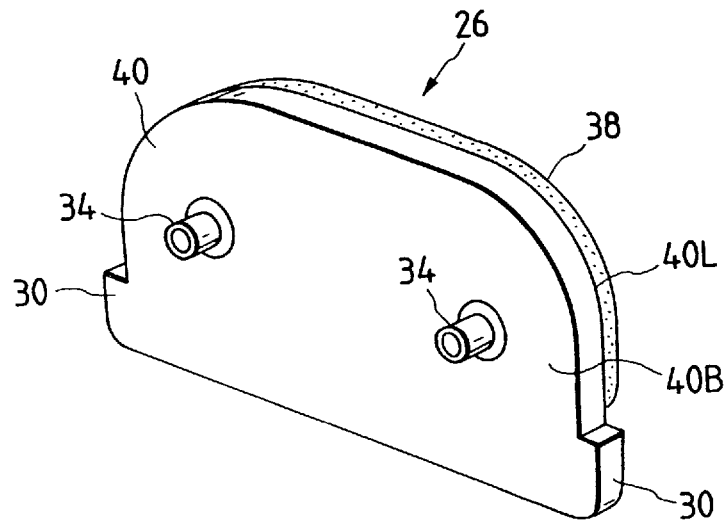
FIG. 1(a) is a perspective view of a friction pad as viewed from the back side according to an embodiment of the present invention.
Figure 1B:
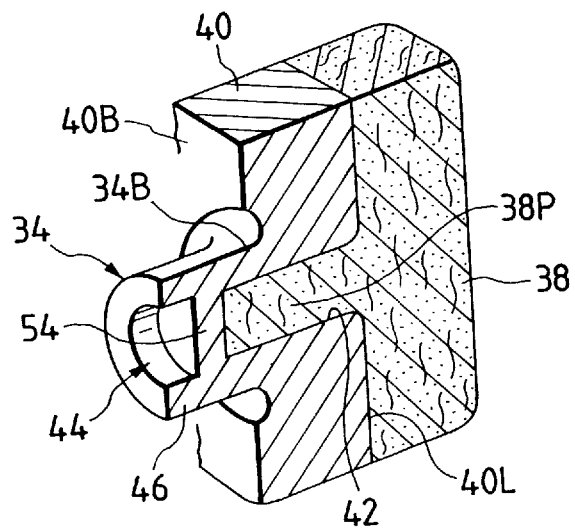
FIG. 1(b) is sectional perspective view of a principal portion of the friction pad.

In the aforementioned disc brake, the outer pad 26 which is brought into pressure contact with the rotor 10 by the caliper pawl 24 has the following structure. As shown in FIGS. 1(a) and 1(b), the outer pad 26 comprises a lining 38 and a back plate 40, and as described above, the protrusions 34, 34 which engage with the torque transmission holes 36, 36 formed on the branched caliper pawl 24 are formed on a back surface 40B of the back plate 40. The protrusion 34 is formed as follows. The back plate 40 is disposed in a metal mold in which a hole equivalent to the protrusion is provided. Then a press-pin is pressed against the back plate from the side of a front surface 40L thereof, on which the lining 38 is attached. That is, the protrusion is formed by the press-drawing. By this manner, a recess portion 42 is formed on the front surface 40L of the back plate 40, on which the lining 38 is attached. On the other hand, the lining 38 has a plug portion 38P which is inserted into the recess portion 42.

The protrusion 34 projects from the back surface 40B of the back plate 40. In the present invention, a recess 44 is formed at a tip end of the protrusion 34. That is, the protrusion 34 is shaped so as to have a H-shaped cross sectional view and have a circular projected portion 46 formed by metal flow at the outer edge portion of the tip end of the protrusion. This structure is achieved in the following manner. As shown in FIG. 2(a), a land portion 50 to form the recess 44 is prepared at the center of the bottom of a metal mold 48. At the press-drawing, the press pin 52 is press-fitted into the material for the back plate 40, so that the land portion 50 forms the recess 44 at the tip end of the protrusion 34 and a partitioning wall 54 in the inner middle portion of the protrusion 34. The metal portion which corresponds to the recess portion 44 flows into the side wall portion of the protrusion 34 so as to form the circular projected portion 46. FIG. 2(b) is an example of the protrusion in the prior art. The total length of the protrusion 34 is metal flow amount from the recess 44 (dimension difference h) larger than that of the prior art.

The projection 34 is projected from the back surface 40B so as to have a cylindrical shape. However, the partitioning wall 54 which is located between the recess portion 42 on the lining side and the recess 44 on the caliper side secures the shear strength and the thickness of a base portion 34B which is the minimum thickness portion of the protrusion 34 is not reduced. Therefore, the shear strength at this portion is not deteriorated.

As shown in FIG. 3, in the aforementioned outer pad 26, the protrusions 34 are inserted into the torque transmission holes 36 formed in the caliper pawl 24, and at the braking operation, the braking force $F_0$ which the outer pad 26 receives is transmitted to the caliper pawl 24 via the protrusion 34 of the back plate 40 which is assembled integrally with the lining 38, and is continuously transmitted to the stationary portion of the vehicle via the caliper 12 and the guide pin 16 (the main guide pin 16 located on the rotor run-out side in the embodiment) of the support member 14. The torque amount which is transmitted from the outer pad 26 to the caliper 12 corresponds to the projection area of the protrusion 34 and the torque transmission hole 36. In the embodiment of the present invention, the total length of the protrusion 34 is extended, so that it is possible to enlarge the engagement area without deteriorating the strength of the protrusion 34. As a result, the structure of the disc brake pad according to the present invention can enhance the torque transmission ratio.

As described above, in the friction pad for the disc brake according to the present invention, a recess is formed at a tip end of the protrusion which is for engagement with the caliper, and a metal flow to the side wall portion of the protrusion is generated at the press-drawing and increases the length of the protrusion. Therefore, it is possible to secure enough height of the protrusion, so that the caliper pawl is caught to the torque transmission hole with ease. Therefore, it is possible to prevent the pad from tilting effectively.

What is claimed is:

1. A friction pad for a disc brake comprising:
   a back plate having a protrusion formed on a second surface thereof, wherein the back plate and the protrusion are formed as one piece, such that the protrusion can engage with a caliper in such manner that the protrusion is inserted into a torque transmission hole, where the protrusion is formed by press-drawing using a press mold such that a first recess portion is provided on a first surface of the back plate directly behind the protrusion;
   said protrusion comprising:
      a cylindrical base portion;
      a cylindrical projected portion;
      a partitioning wall located between the base portion and the projected portion, such that a first recess portion is provided directly behind the partitioning wall of the protrusion, which together with the first recess portion in the back plate form a plug receiving recess; and a lining attached on the first surface of the back plate, wherein a second recess portion is formed at a tip end of the protrusion in front of the partitioning wall so as to extend a length of the protrusion.

2. The friction pad for a disc brake according to claim 1, wherein a sectional view of the protrusion is H-shaped.

* * * * *